United States Patent [19]

Hogg

[11] Patent Number: 4,782,940
[45] Date of Patent: Nov. 8, 1988

[54] CAPTIVATED BLOCK AND STRAP LINK CHAIN

[75] Inventor: Thomas M. Hogg, Lanarkshire, Scotland

[73] Assignee: Anderson Strathclyde PLC, Glasgow, Scotland

[21] Appl. No.: 872,483

[22] Filed: Jun. 10, 1986

[30] Foreign Application Priority Data

Jun. 13, 1985 [GB] United Kingdom ............... 8515033

[51] Int. Cl.⁴ ..................... B65G 17/38; B65G 19/20
[52] U.S. Cl. ............................. 198/735; 198/851; 198/852
[58] Field of Search ............. 198/735, 851, 852; 299/34, 42, 43; 474/212, 226, 232, 235, 157

[56] References Cited

U.S. PATENT DOCUMENTS

| | | | |
|---|---|---|---|
| 3,439,494 | 4/1969 | Hutton et al. | 474/226 X |
| 4,162,810 | 7/1979 | Oberste-Beulmann | 299/43 |
| 4,184,715 | 1/1980 | Lanfermann | 299/43 |
| 4,186,970 | 2/1980 | Minke et al. | 299/43 |
| 4,269,304 | 5/1981 | Braun et al. | 198/735 |
| 4,326,753 | 4/1982 | Rynik | 299/43 |
| 4,372,619 | 2/1983 | Braun | 299/43 |
| 4,501,447 | 2/1985 | Tatton et al. | 474/235 |
| 4,524,859 | 6/1985 | Gotte et al. | 198/735 |
| 4,536,036 | 8/1985 | Hogg | 299/43 |

Primary Examiner—Jerome Massie
Assistant Examiner—Bruce M. Kisliuk
Attorney, Agent, or Firm—Mason, Fenwick & Lawrence

[57] ABSTRACT

A flexible track (10) is held captive in an armoured face conveyor and comprises a plurality of blocks (14) arranged in longitudinally spaced relation with a pair of links (15) at opposed transverse sides of each adjacent two blocks interconnecting said blocks and forming apertures (18) between adjacent blocks. The blocks (14) have side projections (16) and the links (15) have corresponding apertures which are of slightly greater dimensions longitudinally to permit a small amount of longitudinal movement (end-float) of each block (14) relative to its two pairs of links (15). Each block has a vertical aperture (22) through its body, the apertures (22, 18) in the blocks and between the end faces (20, 21) of adjacent blocks being adapted to receive a tooth (25) of a toothed wheel (26) mounted on a machine movable along the conveyor. The aperture (22) in the block (14) has end faces (23, 24) and the profile of said end faces (23, 24) and of the end faces (20, 21) of the block where the teeth of the driving wheel engage an aperture (18) are of involute form and mirror image reversible. The armoured face conveyor is formed of a longitudinal series of line pans (30) connected end to end and having a furnishing which includes a longitudinal channel to guide and locate the mining machine relative to the armoured face conveyor. The channel holds the flexible track (10) captive for engagement by the drive sprocket wheel (26).

8 Claims, 4 Drawing Sheets

CAPTIVATED BLOCK AND STRAP LINK CHAIN

BACKGROUND OF THE INVENTION

The invention relates to a track by which a mining machine hauls itself in either direction along a mine face.

Several problems are experienced with existing tracks:

1. The conveyor pans to which the current tracks are attached, must articulate in the horizontal plane in order to advance the conveyor and in the vertical plane to allow the conveyor to accommodate undulations in the mine floor. Toothed rack tracks are known where this articulation effects the pitch between the teeth of adjacent racks to an extent where the error in pitch adversely affects the engagement between the driving means of the mining machine (e.g. wheel, pinion or continuous chain) and the racks.

2. Conversely the racks of some existing tracks maintain a gap at the same side of the conveyor pan to which they are attached and consequently reduce the amount of articulation available to the conveyor. In turn this restriction places on the racks the relatively high forces required to advance the conveyor over the mine floor; bearing in mind that this advancement can take place over say 10 adjacent pans each approximately 1.5 meters long compared to a width of 0.75 meters it can be seen that forces theoretically 20 times that which push-over rams can generate will be exerted on the joint between adjacent racks. To design a joint strong enough to withstand such forces requires a considerable amount of cross sectional area not normally available in the vicinity of the track (but normally available in the vicinity of the sides of the conveyor pans).

3. Other tracks are known in which a roller chain is captivated in furnishings attached to the face side of the conveyor pans or alternatively a round link chain is captivated to the spill plates attached to the goaf side ofthe conveyor pan and these tracks assist in overcoming the problems at 1. and 2. above. However, since the contact ratio between the driving means of the mining machine and track is rarely greater than 1 the profile of the roller chain or the round link chain where it engages with the driving means of the mining machine creates on the driving means, high tooth pressures and high separating forces relative to the haulage force.

4. During the cycle of one of the teeth (or rollers) of existing mining machine driving means engaging a tooth or link of existing tracks, travelling across it, and consequently leaving as the drive is taken up by the adjacent teeth, fluctuations in power are required to maintain the required haulage effort. These repeated fluctuations in power demand, created by the relative profiles of driving means and rack, subject the driving means, the drive reduction gearing and the associated prime mover (either hydraulic or electric motor) to high fluctuations in load, which can adversely affect the reliability of these elements.

5. Other tracks are known where, in order to accommodate articulation of the conveyor pans, alternate racks are allowed a limited amount of end float. This facility produces in the driving means, the reduction gearing and associated prime mover high shock loads each time the drive has to take up this end float in conditions where the pans are not articulated to one another.

SUMMARY OF THE INVENTION

The object of the invention is to obviate or mitigate the aforementioned problems by providing a block and strap link chain arrangement captivated to the furnishings associated with the conveyor pans e.g. the spill plates on the goaf side of the conveyor pans.

According to one aspect of the present invention there is provided a flexible track held captive in an armoured face conveyor and comprising a plurality of blocks arranged in longitudinally spaced relation and a pair of links at opposed transverse sides of each adjacent two blocks interconnecting said blocks by a connecting means which creates an aperture between adjacent blocks and permits a small degree of longitudinal movement between said blocks, each block having an aperture in the upper face of its body, the apertures in the blocks and between end faces of adjacent blocks being adapted to receive a tooth of a toothed wheel mounted on a machine movable along the conveyor.

Preferably said connecting means comprises transversely projecting, longitudinally elongate projections and co-operating recesses on the blocks and links whereby each pair of links engages the adjacent end of each block.

Preferably the aperture in each block extends therethrough.

Preferably also, the profile of the aperture in the block has end faces and the profile of said end faces and of the end faces of the block where the teeth of the driving wheel engage are of involute form and mirror image reversible.

According to another aspect of the invention, there is provided an armoured face conveyor formed of a longitudinal series of line pans connected end to end and having a furnishing which includes a longitudinal channel to guide and locate the mining machine relative to the armoured face conveyor and being adapted to hold captive a flexible track for engagement by a drive sprocket wheel of a mining machine mounted on the conveyor for movement therealong in either direction, said track comprising a plurality of blocks arranged in longitudinally spaced relation and a pair of links at opposed transverse sides of each adjacent two blocks by a connecting means which permits a small degree of longitudinal movement between adjacent blocks, an aperture in the upper face of the body of each block, and an aperture created between each adjacent blocks by the said pair of links, each of said apertures being adapted to receive teeth of the sprocket wheel of the mining machine and, stop plates connected to the furnishing and located between adjacent links at at least one location above each line pan thus fixing the position of one block and its four associated links relative to that line pan, and consequently limiting the accumulative contraction or expansion of the track.

Preferably, the aperture in each block extends therethrough.

Preferably also, the aperture in each block has opposed end faces and the profile of these end faces and the end faces of the block, and the teeth of the drive wheel are of an involute form.

An embodiment of the invention will now be described, by way of example, with reference to the accompanying drawings.

DETAILED DESCRIPTION OF THE INVENTION

Figure 1:
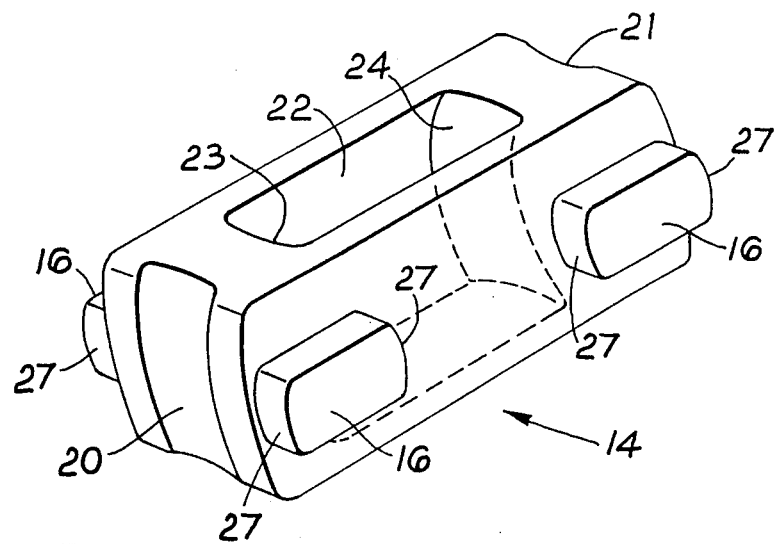
FIG. 1 is an isometric view of a block of a track according to the invention.
Figure 2:
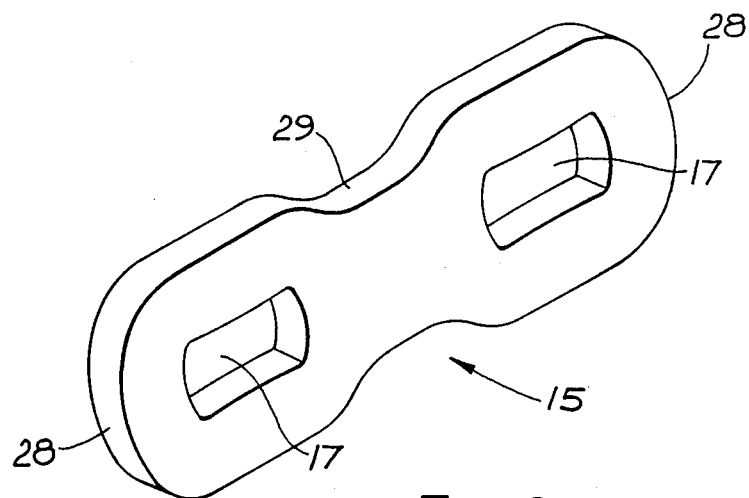
FIG. 2 is a similar view of a link of the track.
Figure 3:
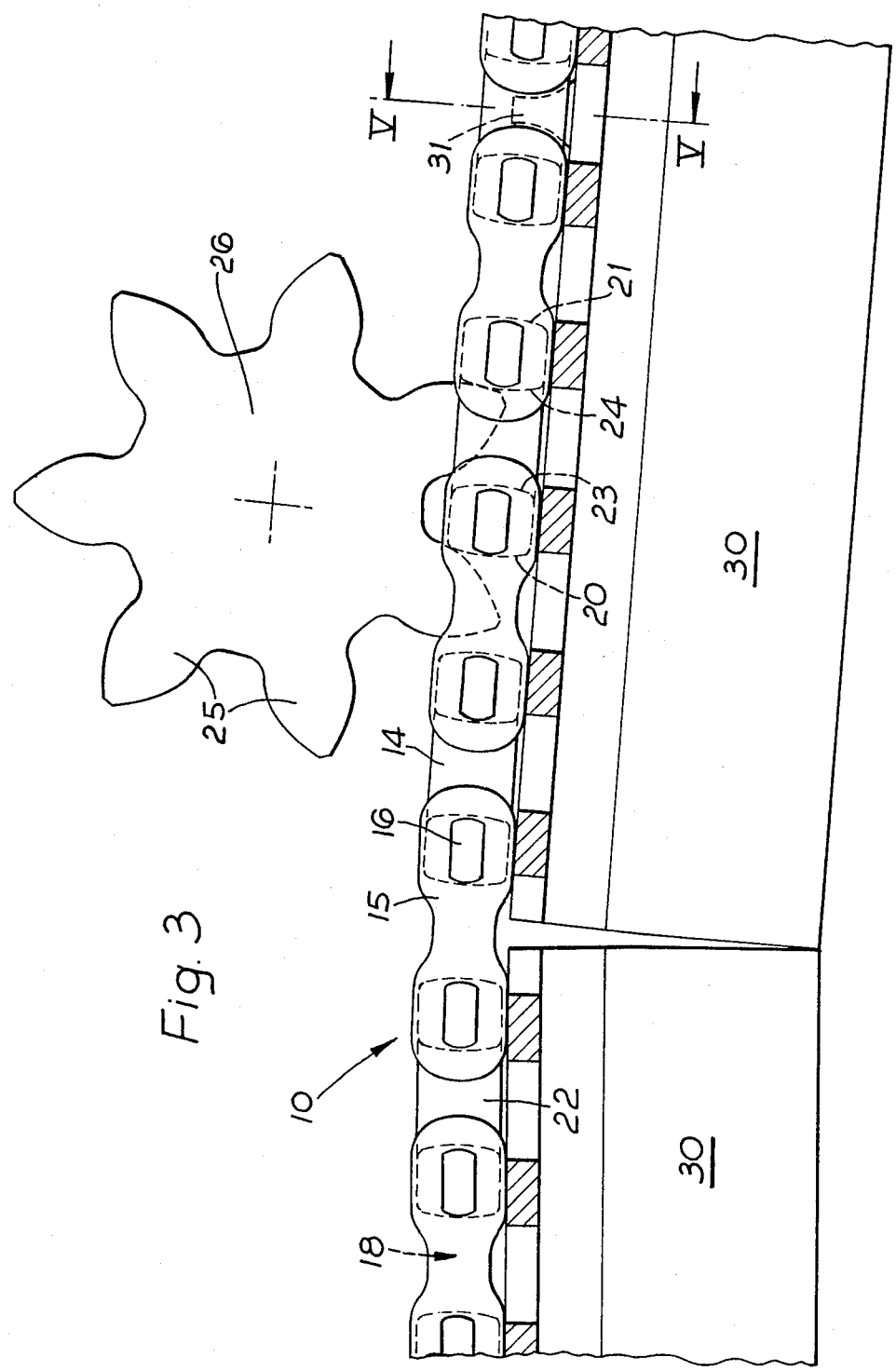
FIG. 3 is a side elevation of a portion of an armoured face conveyor on which the track is held captive, and includes the drive sprocket wheel carried by a mining machine mounted on the conveyor.

Referring to the drawings, the track 10, in the form of a block-link chain is located on an armoured face conveyor 11 and is held captive in a channel 12 mounted on the conveyor furnishings 13 on the goaf side of the conveyor. The track comprises a series of blocks 14 spaced longitudinally and a series of longitudinally spaced strap links 15 at each side of the blocks 14 with transversely spaced pairs of links interconnecting adjacent blocks, by means of projections 16 on the blocks and apertures 17 in the links. Thus vertical aperture 18 is formed between adjacent blocks bounded by end faces 20, 21 of adjacent blocks and the side links 15. The link apertures 17 are of slightly greater dimensions longitudinally so that a small amount of longitudinal movement (end-float) of each block 14 relative to its two pairs of links 15 is possible, for example, 2 mm per connection.

Each block 14 is substantially rectangular in side section and plan the greater length being longitudinal. The end faces 20, 21 are slightly curved outwardly and a vertical opening 22 is formed through the upper and lower faces of the block and the transverse faces 23, 24 of each aperture are slightly curved towards each other. Thus the outer transverse faces 20, 21 of the block and the transverse faces 23, 24 of the block aperture 22 are of involute form and in use two of these faces 24, 20 or 23, 21 are engaged by teeth 25 of a drive sprocket wheel 26 which is part of a mining machine (not shown), depending on the direction of movement of the machine. As the machine moves along the conveyor, the teeth 25 locate successively in apertures 18 and 22 and drive the maching along the conveyor. Towards each end of the block the projections 16 extend laterally from each side face and are substantially rectangular inside elevation with rounded ends 27.

The blocks 14 are symmetrical so they can be turned end to end and upside down; thus if parts of the block become worn through more wear occurring in one direction than in the other the blocks can be reversed to increase the life of the track by up to a factor of 4.

During initial assembly it does not matter which way the blocks 14 are disposed; thus their symmetrical shape renders them foolproof against incorrect assembly.

The links 15 are flat and substantially rectangular in shape but with rounded ends 28 and a waist 29, on each side of which is the substantially rectangular opening 17 to receive the block projections 16. Those openings 17 are very slightly longer than the projections 16 so that a longitudinal movement of 2 mm is possible.

A continuous chain is formed of blocks and links and extends the length of the armoured face conveyor which is formed of a series of line pans 30 connected together. At one location on each line pan 30 an anchor point, in the form of a stop plate 31 is located between a pair of links on each side of the blocks, thus limiting the movement of that portion of the chain between longitudinally adjacent stop plates 31 to the accumulated 2 mm increments obtained by movement of the projections 16 in their openings 17 between said stop plates 31. The stop plates 31 on the face side row of links are fixed in the channel 12 but those on the goaf side (not shown) are removable.

Figures 4, 5:
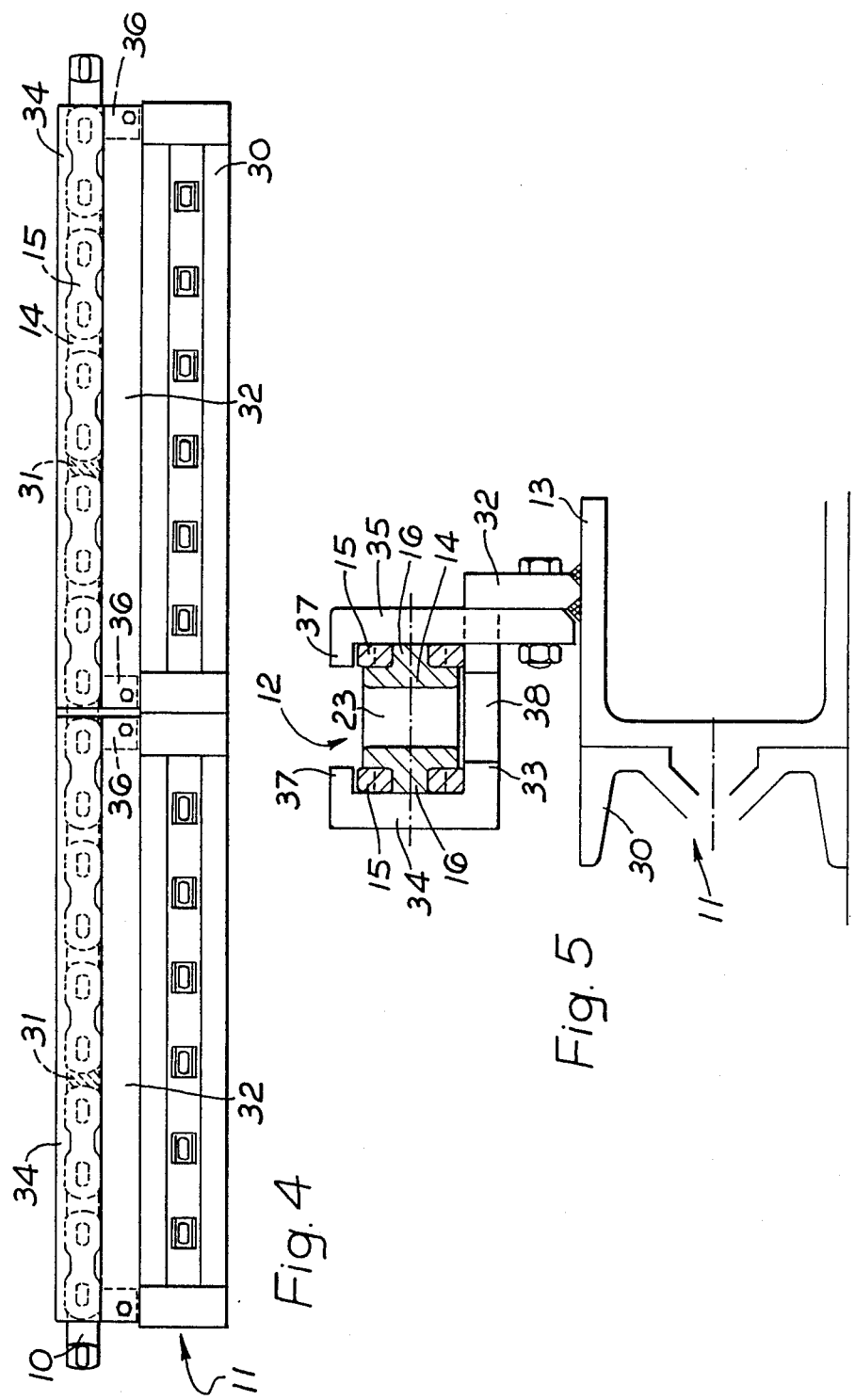
FIG. 4 is a side elevation of the armoured face conveyor showing anchor stop plates.
FIG. 5 is a part sectional end view on the line V—V of FIG. 3 but omitting the drive sprocket wheel.

The channel 12 is formed, as shown in FIG. 5 by a trough which has an upstanding base 32 welded to and forming part of the furnishing 13, a horizontal floor 33 and an upstanding face side wall 34 and by a goaf side wall which is formed by a removable plate 35. The plate 35 has depending ends 36 (FIG. 4) by which it is bolted to the base 32. The fixed stop plates 31 on the face side of the channel 12 are attached to the trough, while the removable stop plates are attached to the removable plate 35. At the upper end of the walls 34 and 35 are flanges 37 which overlie the channel 12 and trap the track 10 therein once the removable plate 35 has been mounted on the trough. The floor of the channel has a series of apertures 38 spaced along its length to allow dirt and other matter to escape.

Since the track is primarily a chain the pitch between adjacent blocks is controlled, thus improving the engagement between the driving means and the track at all times.

FIGS. 6 to 9 illustrate different dispositions of the track 10.

Figure 6:
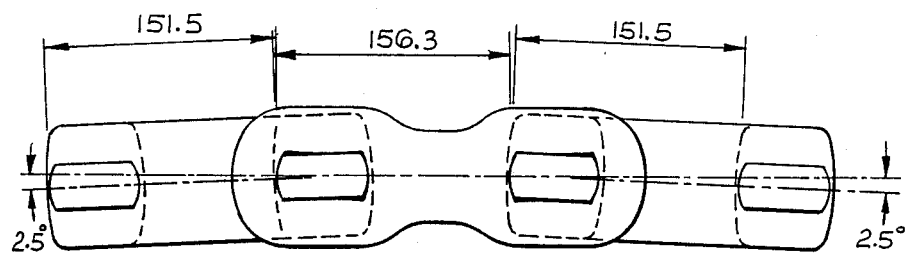
FIGS. 6 to 9 are side views of a portion of the track illustrating different dispositions of the track.

In FIG. 6, the pitch is maximum, the chain is at maximum extension and the block links are at maximum angle.

Figure 7:
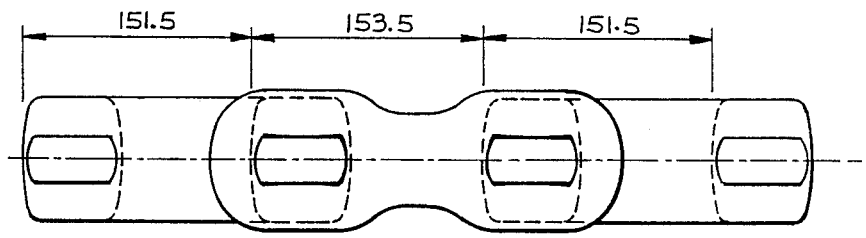

In FIG. 7, the pitch is maximum and the chain is horizontal.

Figure 8:
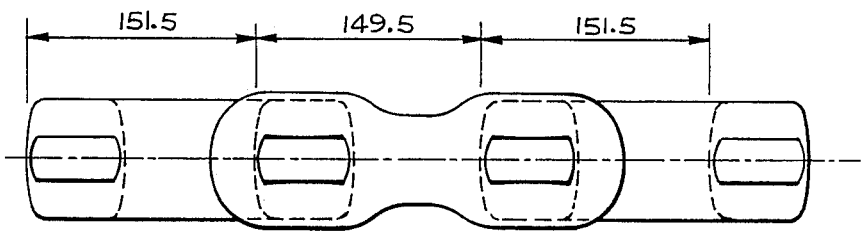

In FIG. 8 the pitch is minimum with the chain horizontal, and

Figure 9:
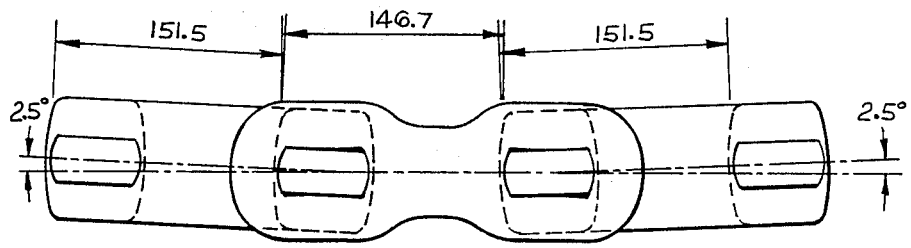

In FIG. 9, the pitch is minimum, the chain is in compression and the block links are at maximum angle.

To allow articulation of the conveyor pans to take place there is a small but adequate amount of articulation and "end float" permitted at the joint between adjacent blocks and strap links. Since there are a number of these blocks and strap links per conveyor pan length, the accummulative effect of this end float allows a greater degree of articulation between conveyor pans than exists at present.

This greater degree of articulation can be applied such as to ensure that firstly the track is not subjected to compressive stresses when the conveyor pans are closed up and secondly when the conveyor pans are in tension that the means of controlling the maximum gap between the conveyor pans is integral with the conveyor pans and therefore does not subject the track to the conveyor advancing forces explained above under 2.

The track, being a chain, articulates about its own centre line and therefore pitch errors are not induced when the conveyor pans have to follow an undulating mine floor. However, in the case of undulating floors, due to the relative position of the track to the mine floor and to the conveyor pans, the blocks and strap links require to be sufficiently strong to withstand the tensile and compressive forces induced in the track when the conveyor pans articulate to follow the said undulations. The blocks and strap links are indeed strong enough to limit, by a reasonable amount, the degree of vertical articulation available to the conveyor pans, again by virtue of the accumulative effect of the end float available at each block and strap link, and by locating one block and strap link assembly in the vicinity of the centre of each conveyor pan furnishing.

The profile of the block where the driving wheel engages, and the profile of the teeth of the driving wheel being of an involute form ensure that the tooth force relates as closely as possible to the haulage force and negates as far as possible, separating forces. The involute form also greatly reduces the fluctuations in power demand during each cycle, as previously explained, and therefore improves the life and reliability of the driving means, the reduction gearing and associated prime mover.

The end float between adjacent block is small so that when the end float is taken up by the driving means, fluctuations in power demand are reduced to an acceptable level, thus again improving the life and reliability of the driving means, reduction gearing and associated prime mover.

The method of captivation also affords a riding and locating track on which shoes of the mining machine ride, thus supporting the guiding mining machine. Since the blocks and strap link chain in its captivated form possesses a reasonable amount of rigidity, the block and links which span the joint are used as a means of ensuring alignment between adjacent captivating tracks, facilitating smooth transition of the shoes of the mining machine from one captivating track to the next.

I claim:

1. A flexible track held captive in an armored face conveyor and comprising a plurality of identical blocks arranged in longitudinally spaced relation and a pair of links at opposed transverse sides of each adjacent two blocks, co-operating connecting means on the blocks and links to interconnect adjacent blocks in longitudinally spaced relation to create an aperture between adjacent blocks, said co-operating connecting means having a clearance to permit a small degree of longitudinal movement between said blocks, each block having an aperture in its upper face and in the under face of its body, the apertures in the upper face of blocks and the apertures between the end faces of adjacent blocks being adapted to receive a tooth of a toothed wheel mounted on a machine movable along the conveyor, each block being individually reversible and invertible whereby faces worn by engagement with the toothed wheel can be replaced.

2. A track as claimed in claim 1, in which said connecting means comprises transversely projecting, longitudinally elongate profections on the blocks and co-operating recesses in the links whereby each pair of links engages the adjacent end of each block.

3. A track as claimed in claim 8 in which the aperture in each block extends therethrough.

4. A track as claimed in claim 1, 2 or 3 in which the aperture in the block has end faces and the profile of said end faces and that of the end faces of the block where the teeth of the driving wheel engage are of involute form and mirror image reversible.

5. An armored face conveyor formed of a longitudinal series of line pans connected end to end and having a furnishing which includes a longitudinal channel to guide and locate a mining machine relative to the armored face conveyor and being adapted to hold captive a flexible track for engagement by a drive sprocket wheel of a mining machine mounted on the conveyor for movement therealong in either direction, said track having a horizontal center line and comprising a plurality of blocks arranged in longitudinally spaced relation and a pair of links at opposed transverse sides of each adjacent two blocks interconnecting said blocks by a connecting means which permits a small degree of longitudinal movement between adjacent blocks, an aperture in the upper face of the body of each block, and an aperture created between each pair of adjacent blocks by the said pair of links, each of said apertures being adapted above the longitudinal center line of the track to receive teeth of the sprocket wheel of the mining machine and, stop plates connected to the furnishing and located between adjacent links at at least one location above each line pan thus fixing the position of one block and its four associated links relative to that line pan, and consequently limiting the accumulative contraction or expansion of the track.

6. An armoured face conveyor as claimed in claim 5, in which the aperture in each block extends therethrough.

7. An armoured face conveyor as claimed in claim 5 or 6 in which the aperture in each block has opposed end faces and the profile of these end faces and of the end faces of the block, and the teeth of the drivewheel are of an involute form.

8. An armoured face conveyor as claimed in claim 5, in which each block is individually reversible and invertible, whereby faces worn by engagement with the toothed wheel can be replaced.

* * * * *